United States Patent
Terunuma et al.

(10) Patent No.: US 7,403,358 B2
(45) Date of Patent: Jul. 22, 2008

(54) THIN FILM MAGNETIC HEAD, MAGNETIC HEAD DEVICE, MAGNETIC RECORDING/REPRODUCING DEVICE AND METHOD FOR FABRICATING A THIN FILM MAGNETIC HEAD

(75) Inventors: Koichi Terunuma, Chuo-ku (JP); Koji Shimazawa, Chuo-ku (JP); Akifumi Kamijima, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/227,126

(22) Filed: Sep. 16, 2005

(65) Prior Publication Data
US 2006/0007604 A1    Jan. 12, 2006

Related U.S. Application Data

(62) Division of application No. 10/191,484, filed on Jul. 10, 2002, now abandoned.

(30) Foreign Application Priority Data
Jul. 24, 2001  (JP) .............................. 2001-222731

(51) Int. Cl.
G11B 5/39 (2006.01)
G11B 5/127 (2006.01)

(52) U.S. Cl. ..................................... 360/322

(58) Field of Classification Search ................ 360/324, 360/324.1, 324.11, 324.12, 322
See application file for complete search history.

(56) References Cited

U.S. PATENT DOCUMENTS

| | | | |
|---|---|---|---|
| 5,491,600 A * | 2/1996 | Chen et al. .................... 360/322 |
| 5,608,593 A * | 3/1997 | Kim et al. ............... 360/324.12 |
| 5,680,282 A * | 10/1997 | Alhert et al. ................. 360/322 |
| 5,742,459 A * | 4/1998 | Shen et al. ............. 360/327.32 |
| 5,828,532 A * | 10/1998 | Ahlert et al. ................. 360/322 |
| 5,946,167 A * | 8/1999 | Hara et al. .................... 360/322 |
| 6,162,305 A * | 12/2000 | Hsiao et al. .................. 148/280 |
| 6,493,194 B1 * | 12/2002 | Sakaguchi et al. .......... 360/322 |
| 6,587,315 B1 * | 7/2003 | Aoki et al. .................... 360/322 |
| 6,639,764 B2 | 10/2003 | Saito et al. |
| 6,643,107 B1 * | 11/2003 | Hasegawa et al. ......... 360/324.1 |
| 6,961,223 B2 * | 11/2005 | Hasegawa .................... 360/322 |
| 7,072,151 B2 * | 7/2006 | Lin et al. ...................... 360/322 |
| 2001/0026424 A1 | 10/2001 | Kamata et al. |
| 2002/0154457 A1 * | 10/2002 | Horng et al. ............ 360/324.12 |

FOREIGN PATENT DOCUMENTS

| EP | 661692 A1 * | 7/1995 |
| JP | A 06267031 | 9/1994 |
| JP | A 06325330 | 11/1994 |

(Continued)

*Primary Examiner*—William J Klimowicz
(74) *Attorney, Agent, or Firm*—Oliff & Berridge, PLC

(57) ABSTRACT

A magnetoresistive effective film responds commensurate with an external magnetic field. Magnetic domain-controlling films apply a perpendicular biasing magnetic field to the magnetoresistive effective film. The forefronts of first electrode films constituting a pair of electrode films are overlaid on the magnetoresistive effective film, and the forefront surfaces of the first electrode films are risen at an inner angle of $\theta 1$. Second electrode films are overlaid on the first electrode films, and the forefront surfaces of the second electrode films are risen at an inner angle of $\theta 2$ smaller than the inner angle $\theta 1$.

5 Claims, 11 Drawing Sheets

FOREIGN PATENT DOCUMENTS

| | | |
|---|---|---|
| JP | A 09069210 | 3/1997 |
| JP | A 09305931 | 11/1997 |
| JP | A 11-53716 | 2/1999 |
| JP | A 2000-276719 | 10/2000 |
| JP | A 2001067625 | 3/2001 |

* cited by examiner

THIN FILM MAGNETIC HEAD, MAGNETIC HEAD DEVICE, MAGNETIC RECORDING/REPRODUCING DEVICE AND METHOD FOR FABRICATING A THIN FILM MAGNETIC HEAD

This is a Division of Application No. 10/191,484 filed Jul. 10, 2002, now abandoned. The entire disclosure of the prior application is hereby incorporated by reference herein in its entirety.

BACKGROUND OF THE INVENTION

1. Field of the Invention

This invention relates to a thin film magnetic head, a magnetic head device, a magnetic recording/reproducing device and a method for fabricating a thin film magnetic head.

2. Related Art Statement

In a magnetic recording field, a thin film magnetic head having a spin-valve film (hereinafter, called as a "SV film") as a reading element is mainly employed for developing the recording density and the miniaturization.

The SV film is composed of a pinned layer, a non-magnetic layer and a free layer which are stacked in turn. The magnetization of the pinned layer is fixed in a given direction, and the magnetization of the free layer is rotated commensurate with an external magnetic field. The resistance of the SV film is minimized as the direction of the magnetization of the pinned layer is parallel to that of the free layer, and the resistance of the SV film is maximized as the direction of the magnetization of the pinned layer is anti-parallel to that of the free layer. Therefore, a given external magnetic field is detected by measuring the change in resistance as the free layer is rotated.

In addition, a magnetic domain-controlling film is prepared to apply a perpendicular biasing magnetic field to the free layer. In this case, the free layer is made single domain to prevent Barkhausen noise due to the movement of magnetic wall. The magnetic domain-controlling film may be made of a given antiferromagnetic film. In this case, the perpendicular biasing magnetic field is applied through the bonding with exchange interaction between the antiferro-magnetic film and the magnetic film constituting the free layer. Moreover, the magnetic domain-controlling film may be made of a hard magnetic film. In this case, the perpendicular biasing magnetic field is applied from the hard magnetic film. The former biasing means is called as exchange biasing method, and the latter biasing means is called as hard magnetic biasing method.

In the area of the SV film adjacent to the magnetic domain-controlling film, only the perpendicular biasing magnetic field is generated larger, and a longitudinal biasing magnetic field is not almost generated to form a non-sensitive region, which does not function as a sensor and increase the electric resistance of the magnetic resistive sensor circuit. As the electric resistance of the magnetic resistive sensor circuit is increased, the performance of the magnetic resistive sensor circuit is restricted and electro-migration due to large current density may occur.

In order to decrease the electric resistance of the non-sensitive region, a so-called lead overlaying structure where electrode films are provided at both sides of the SV film beyond the non-sensitive region.

In order to realize the lead overlaying structure, such technique is disclosed in Japanese Patent Application Laid-open No. Tokukai Hei 11-53716 (JP A 11-53716) as that a first electrode film not constituting a lead overlaying structure is formed on a magnetic domain-controlling film, and a second electrode film constituting the lead overlaying structure is formed on the first electrode film by means of reactive ion etching (RIE).

With the above technique, however, since the second electrode film is formed by means of RIE, the rising angle of the second electrode film becomes large to be 60-80 degrees.

In a thin film magnetic head having such a lead overlaying structure, a gap film made of an inorganic film is formed on electrode films and a magnetoresistive effective film by means of sputtering, and a shielding film is formed on the gap film. When the rising angle of a second electrode film is set within 60-80 degrees as mentioned above, however, the gap film can not be formed sufficiently thick at the rising surface of the second electrode film, so that electric insulation can not be created between the second electrode film and the shielding film to be formed on the gap film.

In order to realize the lead overlaying structure, such a technique is also disclosed in Japanese Patent Application Laid-open No. 2000-276719 as to form an electrode film constituting a lead overlaying structure by means of lift-off.

With the lift-off technique, however, the lead overlaying structure is formed in wedge so that the electrode film is risen from on the magnetoresistive effective film by a constant angle, and thus, the forefront of the electrode film is formed in thin blade. Therefore, a large current density is generated at the blade-shaped forefront of the electrode film, and thus, electro-migration due to the larger current density may occur.

SUMMARY OF THE INVENTION

It is an object of the present invention to provide a thin film magnetic head, a magnetic head device, a magnetic recording/reproducing drive device where the reliability in electric insulation between the top shielding film and the electrode film, and a method for fabricating the thin film magnetic head.

It is another object of the present invention to provide a thin film magnetic head, a magnetic head device and a magnetic recording/reproducing drive device where electro-migration due to large current density can be prevented, and a method for fabricating the thin film magnetic head.

In order to achieve the above objects, a thin film magnetic head according to the present invention includes a reading element including a magnetoresistive effective film to respond commensurate with an external magnetic field, a pair of magnetic domain-controlling films to apply a perpendicular biasing magnetic field to the magnetoresistive effective film and a pair of electrode films.

Each electrode film is composed of a first electrode film and a second electrode film. The forefront of the first electrode film is overlaid on the magnetoresistive effective film, and the forefront surface of the first electrode film is risen at an inner angle of θ1.

The second electrode film is formed on the first electrode film. The forefront surface of the second electrode film is risen at an inner angle θ2 smaller than said inner angle θ1.

In the thin film magnetic head of the present invention, the reading element includes a magnetoresistive effective film to respond commensurate with an external magnetic field and a pair of electrode films. The forefront of each electrode film is overlaid on the magnetoresistive effective film. Therefore, a given sense current is supplied to the magnetoresistive effective film through the pair of electrode films, and thus, a given signal can be generated commensurate with an external magnetic field.

The reading element also includes a magnetic domain-controlling film to apply a perpendicular biasing magnetic field to the magnetoresistive effective film. With the perpendicular biasing magnetic field, a magnetic sensitive film constituting the magnetoresistive effective film is made single domain, and thus, Barkhausen noise due to the movement of magnetic wall can be prevented.

The pair of electrode films includes first electrode films, respectively, of which the forefronts are overlaid on the magnetoresistive effective film. In this case, since by setting appropriately the overlaying degree of the first electrode films, the first electrode films are formed beyond the non-sensitive regions of the magnetic domain-controlling films which are formed at the edge portions thereof, a given lead overlaying structure can be realized. Therefore, the performance of the thin film magnetic head can be enhanced, and the electro-migration due to large current density can be prevented.

The pair of electrode films also includes second electrode films, respectively, which are overlaid on the respective first electrode films and of which the forefronts are risen at an inner angle of θ2. On the other hand, the first electrode films are risen from on the magnetoresistive effective film at an inner angle θ1. The inner angle θ2 is set smaller than the inner angle θ1. Conversely, the inner angle θ1 is set larger than the inner angle θ2.

In this case, the thicknesses of the forefronts of the first electrode films overlaying on the magnetoresistive effective film can be increased to prevent the blade shapes of the forefronts of the first electrode films. Therefore, a current density at the forefronts of the first electrode films can be reduced sufficiently, and thus, electro-migration due to large current density can be prevented.

Since the rising angle θ2 of the second electrode film is smaller than the rising angle θ1, the gap film can be formed thick at the forefront of the first electrode film through the wide opening of the second electrode film when the gap film is formed on the second electrode film and the magnetoresistive effective film by means of e.g., sputtering, so electric insulation failure between the top shielding film and the electrode films due to not sufficient thickness of the gap film can be prevented.

The magnetoresistive effective film may be composed of an anisotropy magnetoresistive effective film, but preferably composed of a SV film in view of the high density recording and the miniaturization of a magnetic disk drive device.

The inner angle θ1 of the first electrode film is preferably set within 40-90 degrees, and the inner angle θ2 of the second electrode film is preferably set to 45 degrees or below.

In the case of fabricating the above-mentioned thin film magnetic head, first of all, the magnetoresistive effective film and the magnetic domain-controlling films are formed by means of normal film-forming technique, and then, a first conductive film to construct the first electrode films later is formed on the magnetoresistive effective film and the magnetic domain-controlling films.

Then, a resist mask for lift-off is formed on the first conductive film and above the magnetoresistive effective film.

Then, the second electrode films are formed on the first conductive film via the resist mask by means of sputtering.

Then, the resist mask is lifted off, and the first conductive film is etched by means of reactive ion etching (RIE) using the second electrode films as a mask to form the first electrode films.

Thereafter, requisite steps are carried out for the thin film magnetic to complete the above-mentioned thin film magnetic head.

According to the fabricating method as mentioned above, the thin film magnetic head can be easily and precisely fabricated.

This invention also relates to a magnetic head device and a magnetic recording/reproducing drive device including the above thin film magnetic head. These and other objects, features and advantages of the present invention will become more apparent upon the following detailed description and drawings.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
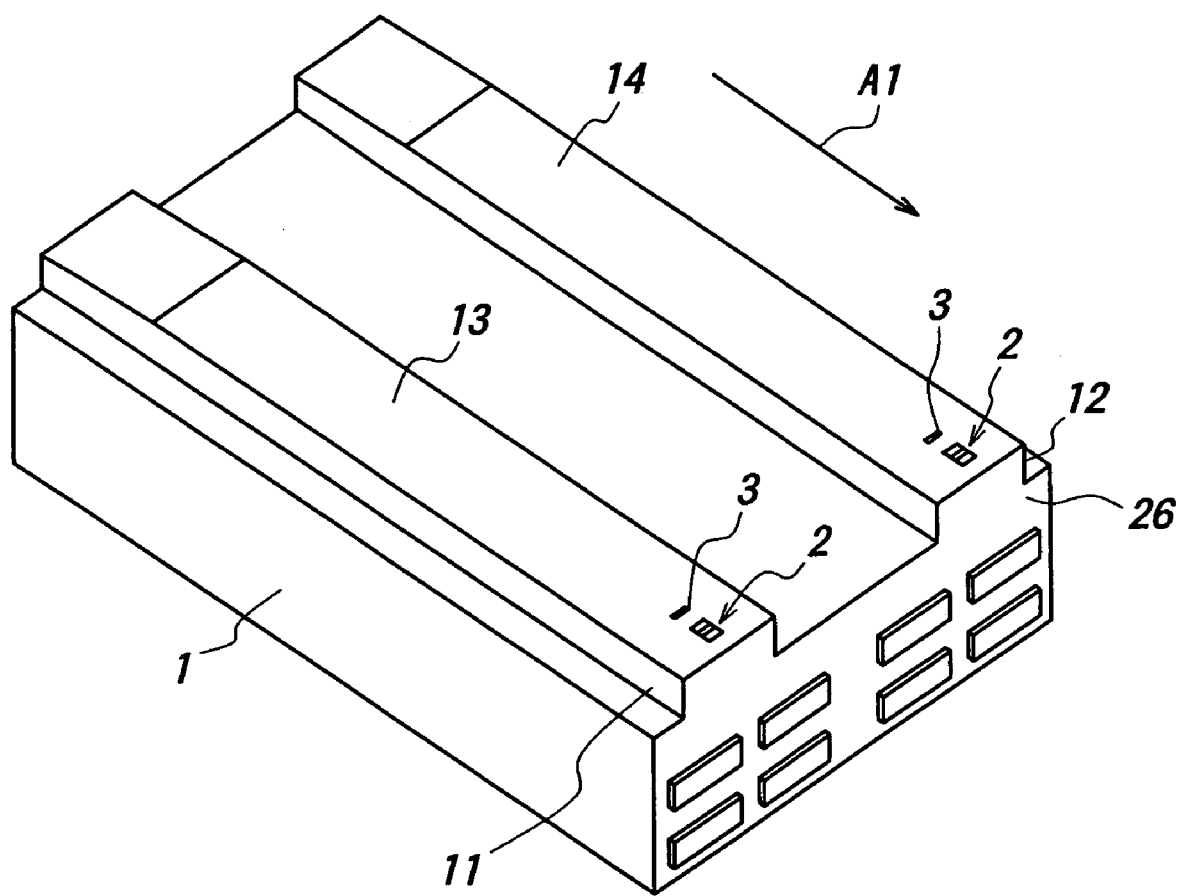
FIG. 1 is a perspective view showing a thin film magnetic head according to the present invention.
Figure 2:
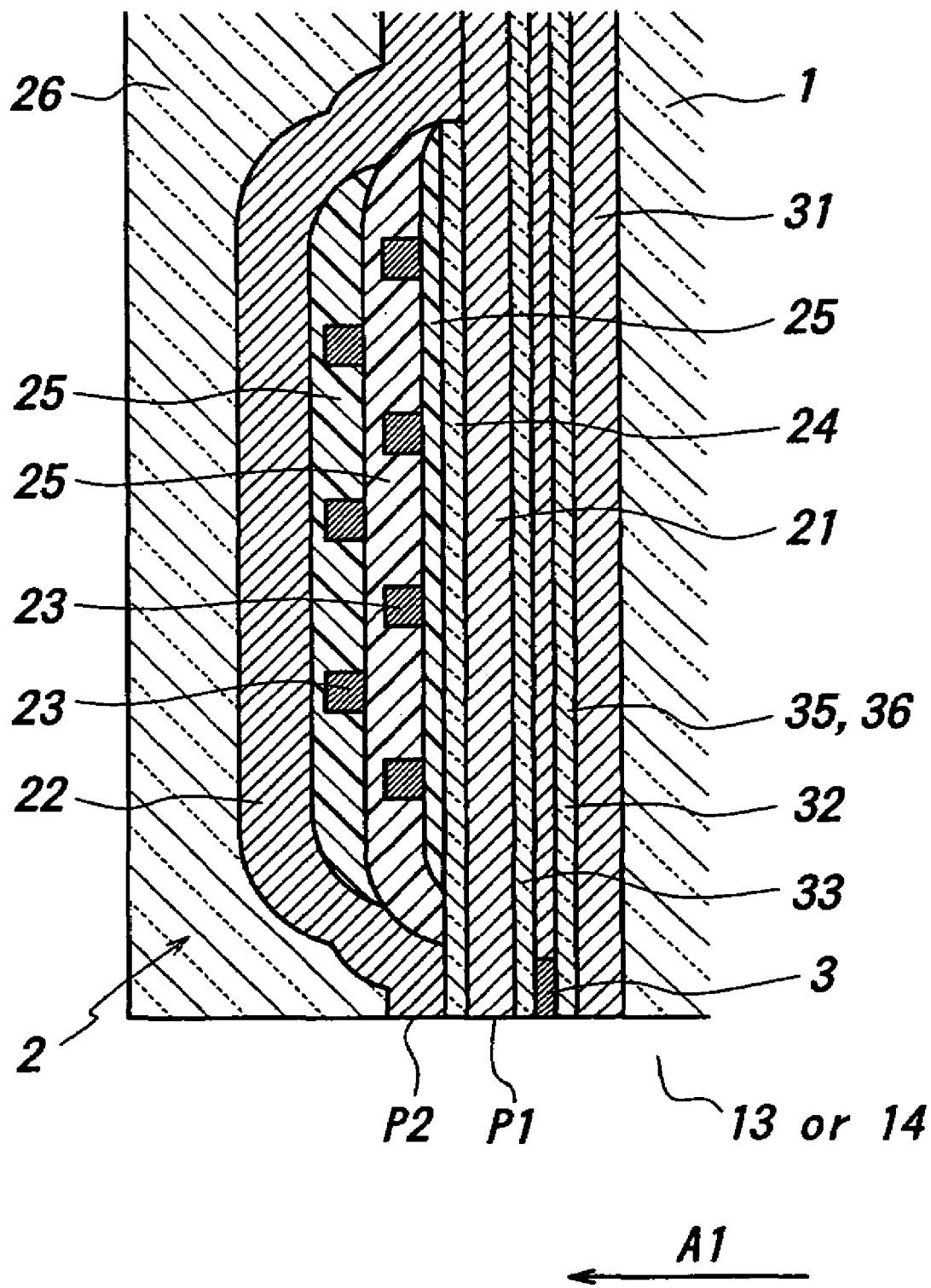
FIG. 2 is an enlarged cross sectional view showing the thin film magnetic head illustrated in FIG. 1.
Figure 3:
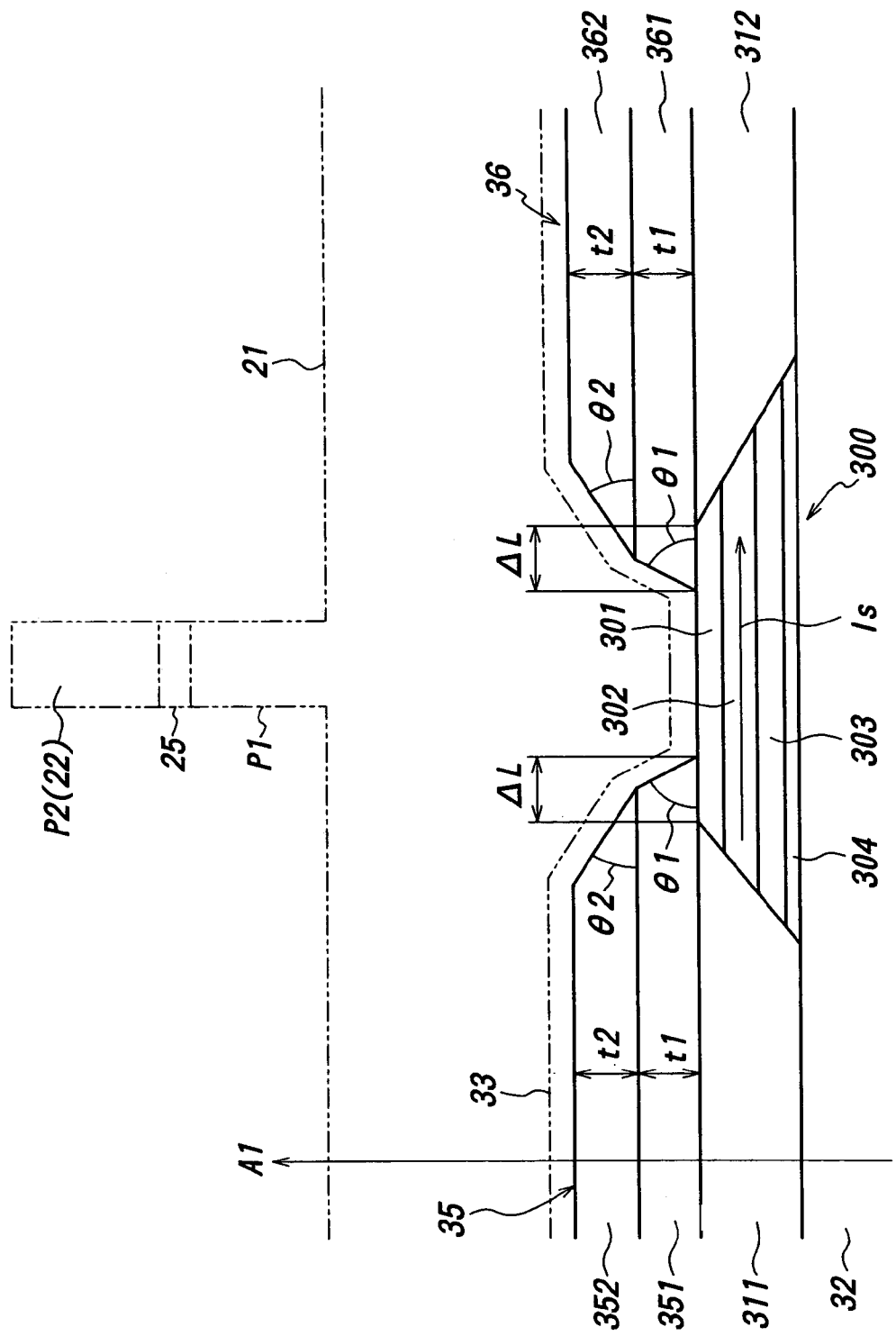
FIG. 3 is an enlarged structural view showing the reading element of the thin film magnetic head illustrated in FIGS. 1 and 2.

This invention will be described in detail, with reference to the drawings, hereinafter. FIG. 1 is a perspective view showing a thin film magnetic head according to the present invention. FIG. 2 is an enlarged cross sectional view showing the thin film magnetic head illustrated in FIG. 1. FIG. 3 is an enlarged structural view showing the reading element of the thin film magnetic head illustrated in FIGS. 1 and 2. In this embodiment, the thin film magnetic head includes a reading element 3 and a writing element 2 made of an inductive type MR element which are formed on a slider 1.

The slider 1 is constructed of a ceramic structural body, and composed of a base made of as $Al_2O_3$—TiC, etc., and an insulating film made of $Al_2O_3$ or $SiO_2$ formed on the base. The slider 1 has air bearing surfaces (hereinafter, called as "ABS"s) 13 and 14 which are opposed to a magnetic recording medium. In FIG. 1, the ABSs 13 and 14 are composed of rails 11 and 12 to generate a positive pressure type airflow. The ABSs 13 and 14 may be formed so as to have various geometrical shapes to generate e.g., negative pressure type airflow. This invention can be applied for any types of slider.

The writing element 2 includes a bottom magnetic film 21 doubling as a top shielding film, a top magnetic film 22, a coil film 23, a gap film 24 made of alumina or the like, an insulating film 25 and a protective film 26 which are stacked on a second gap film 33 made of alumina or the like. The forefronts of the bottom magnetic film 21 and the top magnetic film 22 constitute pole portion P1 and P2 which are opposed each other, and when a magnetic recording disk (not shown) is rotated at high speed, writing operation is carried out by utilizing the pole portion P1 and P2.

The bottom magnetic film 21 and the top magnetic film 22 are joined at a back gap portion located at the opposite side to the pole portions P1 and P2 to complete a magnetic circuit. A coil film 23 is formed on the insulating film 25 so as to whirl around the back gap portion. The depicted writing element 2 is just one embodiment, and this invention is not restricted to the writing element 2 as mentioned above.

The reading element 3 includes a magnetoresistive effective film 300, a pair of magnetic domain-controlling films 311 and 312, and a pair of electrode films 35 and 36. In this embodiment, the reading element 3 is located between the second gap film 33 and a first gap film 32. The first and the second gap films are made of alumina or the like and formed on a bottom shielding film 31 which is formed on the slider base. In this embodiment, the reading element 3 is formed on the writing element 2, but the other way round will do.

The magnetoresistive effective film 300 is constructed as a response film for an external magnetic field, and thus, made of an anisotropy magnetoresistive effective film (AMR film) or a SV film. In this embodiment, the magnetoresistive effective film 300 is made of a SV film. As of now, various types of SV film are proposed in stacking structure and/or film composition, and practically used. This invention can be applied for any types of SV film.

The SV film is fundamentally composed of a pinned layer, a non-magnetic layer, and a free layer which are stacked in turn. The magnetization of the pinned layer is fixed in one direction, and the magnetization of the free layer is rotated freely commensurate with an external magnetic field. In the SV film, the resistance becomes minimum as the direction of the magnetization of the pinned layer is parallel to that of the free layer, and the resistance becomes maximum as the direction of the magnetization of the pinned layer is anti-parallel to that of the free layer. Therefore, the external magnetic field can be detected by measuring the resistance change.

In this embodiment, the SV film is composed of a free layer 301, a non-magnetic layer 302, a pinned layer 303 and an antiferromagnetic layer 304 which are stacked in turn. In this case, adjacent to the antiferromagnetic layer 304, the magnetization of the pinned layer 303 (ferromagnetic layer) is fixed in one direction.

When an external magnetic field is applied to the magnetoresistive effective film 300 made of the SV film, the magnetization of the free layer 301 is rotated commensurate with the strength of the external magnetic field. The resistance of the SV film is determined on the relative angle in magnetization between the pinned layer 303 and the free layer 301. The resistance of the SV film becomes maximum as the direction of the magnetization of the free layer 301 is anti-parallel to that of the pinned layer 303, and becomes minimum as the direction of the magnetization of the free layer 301 is parallel to that of the pinned layer 303. In this case, since the sense current Is is changed commensurate with the resistance change of the SV film, a given external magnetic field can be detected by measuring the sense current Is.

The magnetic domain-controlling films 311 and 312 are joined with both edge sides of the free layer 301. The magnetic domain-controlling films 311 and 312 are made of antiferromagnetic films or hard magnetic films. In this embodiment, the magnetic domain-controlling films 311 and 312 are made of hard magnetic films. A CoPt film and a CoPtCr film may be exemplified as the hard magnetic film.

A given sense current is supplied to the magnetoresistive effective film 300 via the pair of electrode films 35 and 36. The electrode films 35 and 36 include first electrode films 351, 361 and second electrode films 352, 362, respectively. The forefronts of the first electrode films 351 and 361 are overlaid on the magnetoresistive effective film 300 by an overlaying degree of $\Delta L$, and the forefront surfaces of the first electrode films 351 and 361 are risen at an inner angle of $\theta 1$, to form a lead overlaying structure. In this embodiment, since the free layer 301 is located at the top of the magnetoresistive effective film 300, the first electrode films 351 and 361 are overlaid on the free layer 301, and risen from on the free layer 301 at the inner angle $\theta 1$.

The second electrode films 352 and 362 are overlaid on the first electrode films 351 and 361, and the forefront surfaces thereof are risen at an inner angle of $\theta 2$ smaller than the inner angle $\theta 1$.

As mentioned above, the reading element 3 includes the magnetoresistive effective film 300 to respond commensurate with an external magnetic field and the pair of electrode films 35 and 36 of which the forefronts are overlaid on the film 300. Therefore, a given sense current Is is supplied to the magnetoresistive effective film 300 through the pair of electrode films 35 and 36, and a given signal commensurate with the external magnetic field can be detected.

The reading element 3 includes the pair of magnetic domain-controlling films 311 and 312 to apply a perpendicular biasing magnetic field to the magnetoresistive effective film 300. Therefore, the free layer 301 of the magnetoresistive effective film 300 is made single domain, so that Barkhausen noise due to the movement of magnetic domain can be prevented.

As mentioned above, the electrode films 35 and 36 include first electrode films 351 and 361, respectively of which the forefronts are overlaid on the magnetoresistive effective film 300 by the overlaying degree $\Delta L$. Therefore, by setting appropriately the overlaying degree $\Delta L$, the electrode films 35 and 36 can be formed beyond non-sensitive regions of the magnetic domain-controlling films 311 and 312 which are formed at the edge portions, to form a lead over-laying structure. Therefore, the performance of the thin film magnetic head can be enhanced and electro-migration due to large current density can be prevented.

The electrode films 35 and 36 also includes second electrode films 352 and 362 which are overlaid on the first electrode films 351 and 361, and risen at the inner angle of $\theta 2$ which is set smaller than the inner angle $\theta 1$.

In this case, the increase ratio of thickness per unit length of the forefronts of the first electrode films 351 and 361 can be enhanced to prevent the blade shapes of the forefronts of the films 351 and 361, so that the current density at the forefronts of the films 351 and 361 is reduced sufficiently and thus, electro-migration due to large current density can be prevented.

Since the rising angle $\theta 2$ of the second electrode films 352 and 362 is smaller than the inner angle $\theta 1$, the gap film 33 can be formed thick on the second electrode films 352, 362 and the magnetoresistive effective film 30 via the wide opening located between the second electrode films 351 and 361 by means of e.g., sputtering, so that electric insulation failure between the top shielding film (bottom magnetic film) and the electrode films 35, 36, which is originated from the small thickness of the gap film 33, can be prevented.

The inner angle θ1 of the first electrode films 351 and 361 is preferably set within 40-90 degrees, and the inner angle θ2 of the second electrode films 352 and 362 is preferably set to 40 degrees or below.

In the present invention, since the first electrode films 351, 361 and the second electrode films 352, 362 are stacked, the inner angles θ1 and θ2 within the above range can be easily realized.

As shown in FIG. 3, in this embodiment, the forefront surfaces of the second electrode films 352 and 362 are discontinued from the forefront surfaces of the first electrode films 351 and 361. Therefore, the total forefront surfaces of the first and the second electrode films have kinked line shapes, respectively.

In view of the reduction of electric resistance, the first and the second electrode films are preferably made of a conductive material containing Au as a main component.

Then, the technical significance of the inner angles θ1 and θ2 will be described in detail, with reference to examples and comparative examples.

1. Inner Angle θ1

EXAMPLES 1-6

First of all, the first gap layer 32 was formed of $Al_2O_3$ in a thickness of 30 nm on the bottom shielding layer 31 made of NiFe (see, FIG. 2). Then, the magnetoresistive effective film 300 was formed of a SV film on the first gap film 32, and the magnetic domain-controlling films 311 and 312 were formed of CoPt at both edge portions of the film 300.

Then, the electrode films 35 and 36 were formed on the magneto-resistive effective film 300 and the magnetic domain-controlling films 311, 312 to form a lead overlaying structure, on which the second gap film 33 was formed of $Al_2O_3$. Then, the top shielding film (bottom magnetic film) 21 was formed on the second gap film 33.

In forming the lead overlaying structure with the electrode films 35 and 36, the inner angle θ1 of the first electrode films 351 and 361 was varied while the inner angle θ2 of the second electrode film 352 and 362 was maintained constant.

COMPARATIVE EXAMPLES 1-2

The magnetoresistive effective film 300 and the magnetic domain-controlling films 311, 312 were formed in the same manner as Examples. Then, the electrode films 35 and 36 were formed on the magnetoresistive effective film 300 and the magnetic domain-controlling films 311, 312 by means of lift off, to form a lead overlaying structure. Then, the second gap film 33 was formed of $Al_2O_3$ on the electrode films 35 and 36. Then, the top shielding film (bottom magnetic film) 21 was formed on the second gap film 33. The electrode films 35 and 36 were made of their respective single layers.

COMPARATIVE EXAMPLES 3-5

Except that the electrode films 35 and 36 were formed by means of RIE, to form a lead overlaying structure, instead of the lift off, the thin film magnetic head was fabricated in the same manner in Comparative Examples 1-2.

Then, the voltages of dielectric breakdown and the electro-migrations for the thin film magnetic heads fabricated in Examples 1-6 and Comparative Examples 1-5 were measured. The dielectric breakdown voltages were measured between the electrode films 35, 36 and the top shielding film 21. The electro-migrations were measured from the deformation of the edge portions of the electrode films 35 and 36 which are exposed to the ABSs 13 and 14 (see, FIGS. 1 and 2) when a sense current Is of 6 mA was flown in the magnetoresistive effective film 300 made of the SV film for 30 hours at 130° C. The measured results were listed in Table 1.

TABLE 1

| | θ1 (deg.) | t1 (nm) | θ2 (deg.) | t2 (nm) | Voltage of dielectric breakdown relative value | Electro-migration x: occurrence o: not occurrence |
|---|---|---|---|---|---|---|
| Example 1 | 40 | 15 | 35 | 25 | 1.0 | o |
| Example 2 | 50 | 15 | 35 | 25 | 1.0 | o |
| Example 3 | 60 | 15 | 35 | 25 | 1.0 | o |
| Example 4 | 70 | 15 | 35 | 25 | 1.0 | o |
| Example 5 | 80 | 15 | 35 | 25 | 1.0 | o |
| Example 6 | 90 | 15 | 35 | 25 | 1.0 | o |
| Comparative Example 1 | 30 | 40 | — | — | 1.0 | x |
| Comparative Example 2 | 40 | 40 | — | — | 0.9 | o |
| Comparative Example 3 | 50 | 40 | — | — | 0.8 | o |
| Comparative Example 4 | 60 | 40 | — | — | 0.6 | o |
| Comparative Example 5 | 80 | 40 | — | — | 0.4 | o |

Referring to Table 1, in Comparative Example 1 where the inner angle θ1 is set to 30 degrees smaller than 40 degrees and the electrode films 35 and 36 were made of single layers, respectively, the dielectric breakdown voltage of the thin film magnetic head is almost equal to those of the thin film magnetic heads in Examples 1-6, but the electro-migration occurs, different from Examples 1-6.

In Comparative Examples 2-5 where the inner angle θ1 is set more than 40 degrees and the electrode films 35 and 36 are made of single layers, respectively, the dielectric breakdown voltages of the thin film magnetic heads are decreased, but no electro-migration occur. Therefore, it is turned out that large electric insulation and prevention of electro-migration can not be realized simultaneously as long as the electrode films are made of the respective single layers if the lead overlaying structure is formed by means of lift off or RIE.

In contrast, in Examples 1-6 where the electrode films 35 and 36 are made of the first electrode films 351, 361 and the second electrode films 352, 362, respectively, which are stacked in turn and the inner angle θ1 is set within 40-90 degrees, large electric insulation and prevention of electro-migration can be realized simultaneously.

2. Inner Angle θ2

As mentioned above, the magnetoresistive effective film 300 and the magnetic domain-controlling films 311, 312 were formed. Then, the electrode films 35 and 36 were formed on the magnetoresistive effective film 300 and the magnetic domain-controlling films 311, 312, to form a lead overlaying structure. Then, the second gap film 33 was formed of $Al_2O_3$ on the electrode films 35 and 36. Then, the top shielding film (bottom magnetic film) 21 was formed on the second gap film 33.

In forming the lead overlaying structure with the electrode films 35 and 36, the inner angle θ2 of the second electrode films 352 and 362 was varied while the inner angle θ1 of the first electrode film 351 and 361 was maintained constant.

Thin film magnetic heads satisfying the relation of θ2≦45 degrees were classified as Examples 7-10, and thin film magnetic heads satisfying θ2>45 degrees were classified as Comparative Examples 6 and 7.

The voltages of dielectric breakdown and the electro-migrations for the thin film magnetic heads fabricated in Examples 7-10 and Comparative Examples 6-7 were measured in the same manner as mentioned above. The measured results were listed in Table 2.

TABLE 2

|  | θ1 (deg.) | t1 (nm) | θ2 (deg.) | t2 (nm) | Voltage of dielectric breakdown relative value | Electro-migration x: occurrence o: not occurrence |
|---|---|---|---|---|---|---|
| Example 7 | 60 | 15 | 35 | 25 | 1.0 | o |
| Example 8 | 60 | 15 | 45 | 25 | 1.0 | o |
| Example 9 | 80 | 15 | 35 | 25 | 1.0 | o |
| Example 10 | 80 | 15 | 45 | 25 | 1.0 | o |
| Comparative Example 6 | 60 | 15 | 50 | 25 | 0.9 | o |
| Comparative Example 7 | 80 | 15 | 50 | 25 | 0.9 | o |

As is apparent from Table 2, in Examples 7-10 where the condition of θ2≦45 degrees is satisfied, large electric insulation and prevention of electro-migration can be realized simultaneously. In contrast, in Comparative Examples 6 and 7 where the inner angle θ2 is set to 50 degrees and thus, the condition of θ2≦45 degrees is dissatisfied, the dielectric breakdown voltages are decreased with comparison to those in Examples 7-10 but no electro-migration occur.

It is desired that the thickness t1 of the first electrode films 351, 361 and the thickness t2 of the second electrode films 352, 362 satisfy the relation of t1≦t2. The thickness t1 of the first electrode films 351 and 361 is set within 5-20 nm, and the thickness t2 of the second electrode films 352 and 362 is set within 10-50 nm. Therefore, the relation of t1≦t2 is satisfied within the above-mentioned thickness ranges. Next, the technical significance of the relation of t1≦t2 will be described in detail hereinafter.

As mentioned above, the magnetoresistive effective film 300 and the magnetic domain-controlling films 311, 312 were formed. Then, the electrode films 35 and 36 were formed on the magnetoresistive effective film 300 and the magnetic domain-controlling films 311, 312, to form a lead overlaying structure. Then, the second gap film 33 was formed of $Al_2O_3$ on the electrode films 35 and 36. Then, the top shielding film (bottom magnetic film) 21 was formed on the second gap film 33.

In forming the lead overlaying structure with the electrode films 35 and 36, the thickness t2 of the second electrode films 352 and 362 was varied while the thickness t1 of the first electrode film 351 and 361 was maintained constant.

Thin film magnetic heads satisfying the relation of t2≧t1 were classified as Examples 11-14, and thin film magnetic heads satisfying the relation of t2<t1 were classified in Comparative Examples 8-9.

The voltages of dielectric breakdown and the electro-migrations for the thin film magnetic heads fabricated in Examples 11-14 and Comparative Examples 8-9 were measured in the same manner as mentioned above. The measured results were listed in Table 3.

TABLE 3

|  | θ1 (deg.) | t1 (nm) | θ2 (deg.) | t2 (nm) | Voltage of dielectric breakdown relative value | Electro-migration x: occurrence o: not occurrence |
|---|---|---|---|---|---|---|
| Example 11 | 60 | 20 | 35 | 20 | 1.0 | o |
| Example 12 | 80 | 20 | 35 | 20 | 1.0 | o |
| Example 13 | 60 | 20 | 35 | 20 | 1.0 | o |
| Example 14 | 80 | 20 | 35 | 25 | 1.0 | o |
| Comparative Example 8 | 60 | 20 | 35 | 15 | 0.85 | o |
| Comparative Example 9 | 80 | 20 | 35 | 15 | 0.8 | o |

As is apparent from Table 3, in Examples 11-14 where the condition of t2≧t1 is satisfied, large electric insulation and prevention of electro-migration can be realized simultaneously. In contrast, in Comparative Examples 8 and 9 where the relation of t2<t1 is satisfied and thus, the condition of t2≧t1 is satisfied, the dielectric breakdown voltages are decreased with comparison to those in Examples 11-14 but no electro-migration occur.

Figure 4:
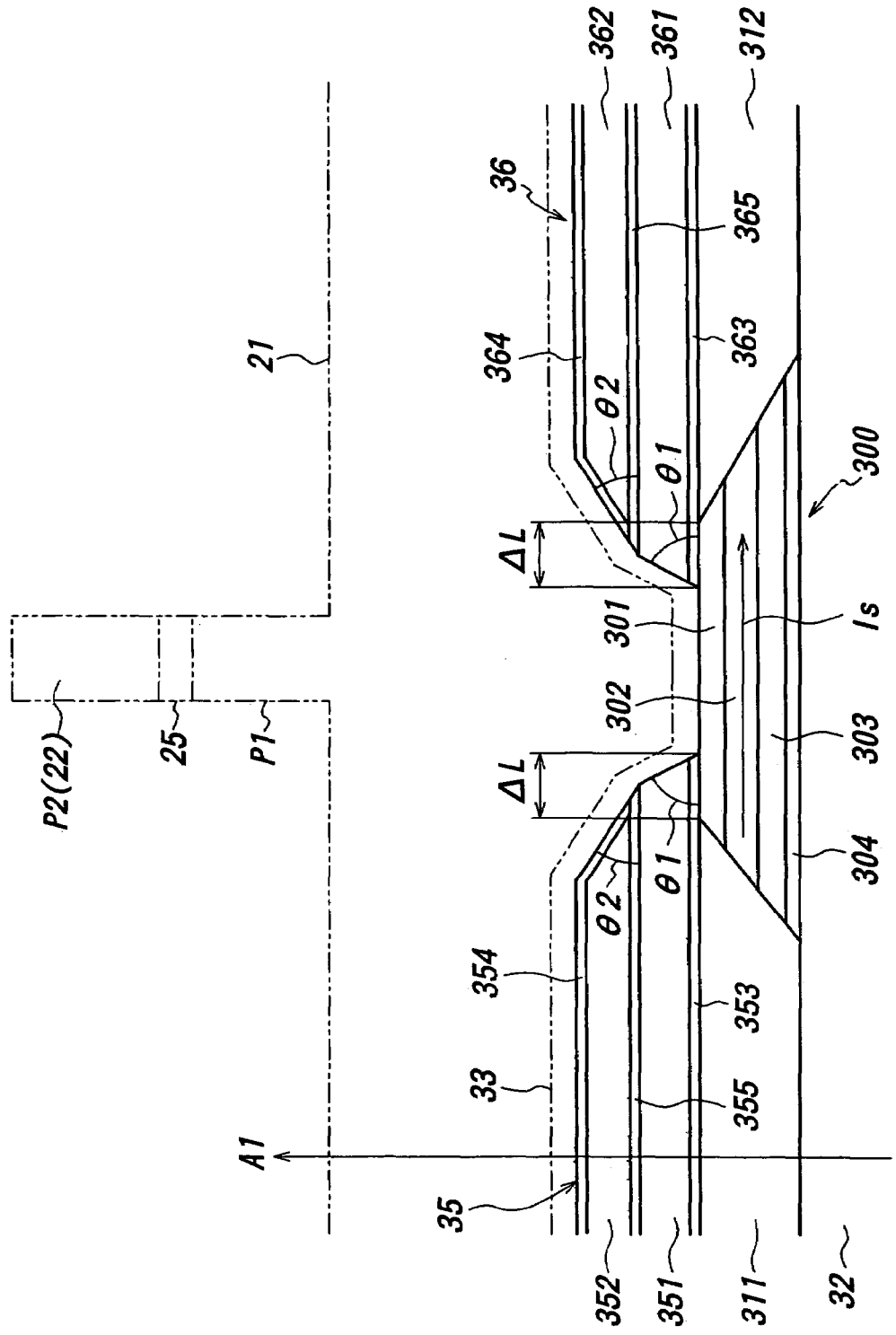
FIG. 4 is an enlarged structural view showing another reading element of a thin film magnetic head according to the present invention.

FIG. 4 is an enlarged structural view showing a reading element of a thin film magnetic head according to the present invention. Like reference numerals are imparted to like constituent elements, and detail explanation for like constituent elements will be omitted. This embodiment is characterized by forming hard films 354 and 364 on the second electrode films 352 and 362. In this case, the second electrode films 352 and 362 made of Au, etc., which have smaller hardness can be protected from sequential manufacturing process damages. The hard films 354 and 364 have larger hardness than the second electrode films 352 and 362. If the second electrode films 352 and 362 are made of Au, the hard films 354 and 364 are made of a material larger in hardness than Au.

Concretely, if the second electrode films 352 and 362 are mainly made of Au, the hard films 354 and 364 are preferably made of at least one selected from the group consisting of Ti, Zr, Hf, V, Nb, Ta, Cr, Mo, W, Ru, Rh, Ir, Pd, Cu, Si and Al. The thickness of the hard films 354 and 364 is set within 1-50 nm.

In this embodiment, hard films 353 and 363 are formed between the first electrode films 351, 361 and the magnetoresistive effective film 300; the magnetic domain-controlling films 311, 312 and between the first electrode films 351, 361 and the second electrode films 352, 362, respectively.

Not shown, a given oxide film may be formed on the hard films 354 and 364. In this case, the reliability in electric insulation between the second electrode films 352, 362 and the top shielding film 21 can be developed. The oxide film may be made of the same material as the hard films 354 and 364 as mentioned above. The thickness of the oxide film is set within 1-10 nm.

Then, the fabricating method of thin film magnetic head will be described with reference to FIGS. 5-9. In this embodiment, the fabricating method for the above thin film magnetic head including the reading element 3 will be mainly described.

Figure 5:
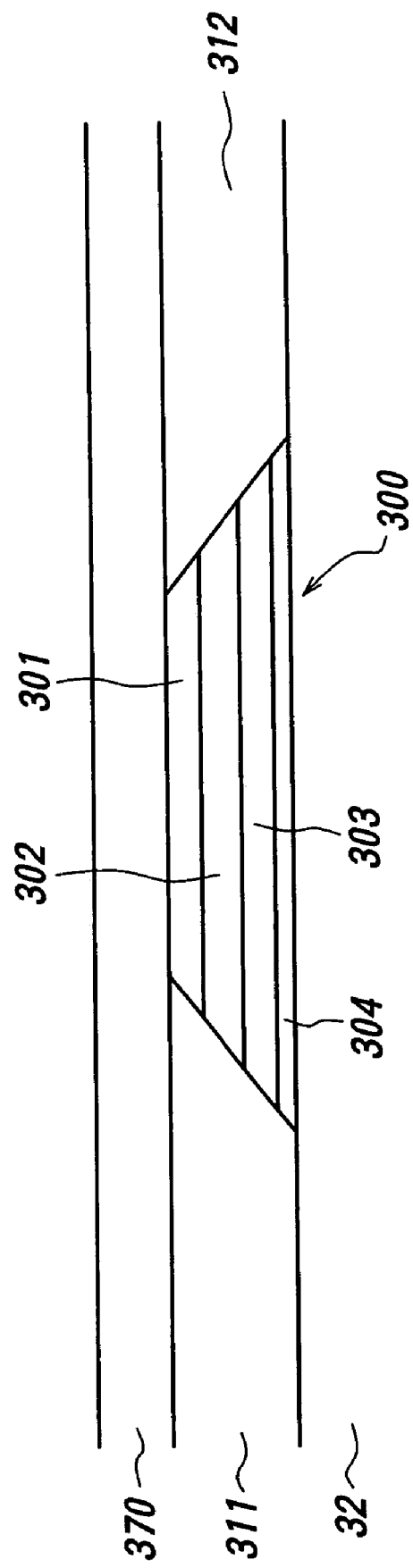
FIG. 5 is an explanatory view showing one step in fabricating a reading element of a thin film magnetic head according to the present invention.

First of all, as shown in FIG. 5, the magnetoresistive effective film 300 and the magnetic domain-controlling films 311, 312 are formed by means of normal film-forming technique, and then, a first conductive film 370 to be processed to the first electrode films 351 and 361 later (see, FIGS. 3 and 4) is formed on the films 300, 311 and 312.

The first conductive film 370 is mainly made of Au by means of sputtering, and the thickness of the film 370 is set within 5-20 nm. The first conductive film 370 may be formed on a given underlayer made of Ta, etc., which is formed on the magnetoresistive effective film 300 and the magnetic domain-controlling films 311, 312.

Figure 6:
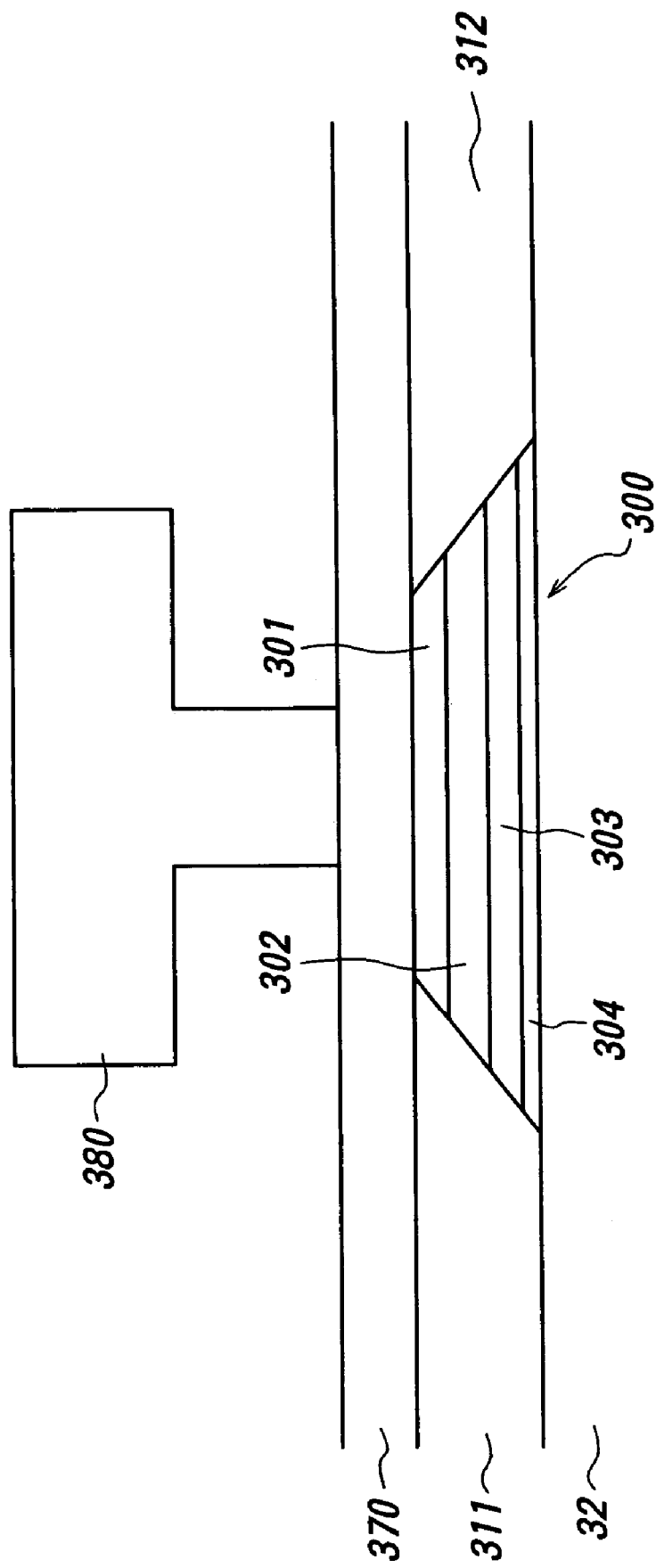
FIG. 6 is an explanatory view showing the next step after the step shown in FIG. 5.

Then, as shown in FIG. 6, a resist mask 380 for lift off is formed on the first conductive film 370 and above the magnetoresistive effective film 300 by means of photolithography.

Figure 7:
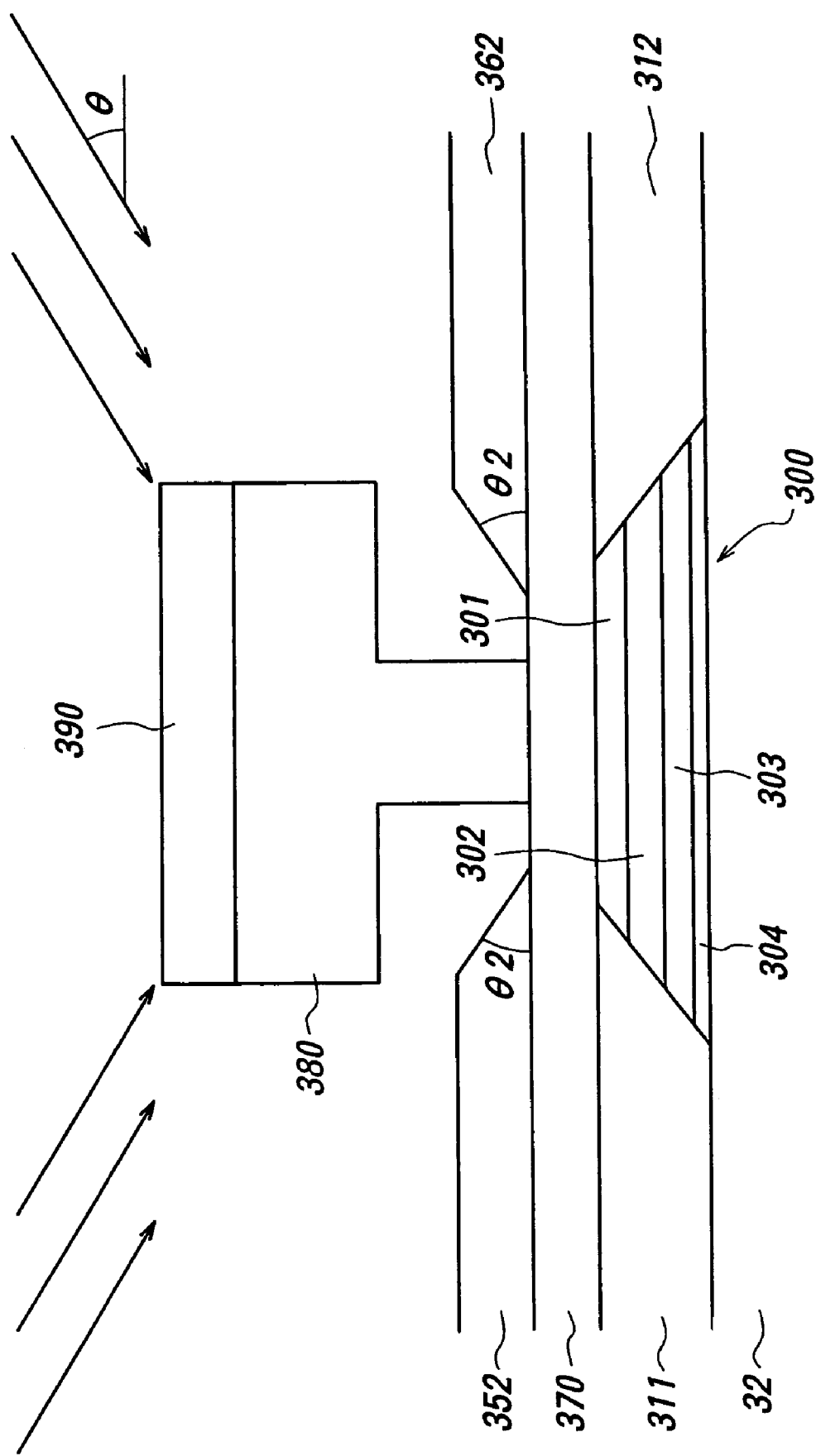
FIG. 7 is an explanatory view showing the next step after the step shown in FIG. 6.

Then, as shown in FIG. 7, the second electrode films 352 and 362 are formed on the first conductive film 370 via the resist mask 380 by means of sputtering. In this case, an electrode film 390 is deposited on the resist mask 380 through the sputtering process.

In forming the second electrode films 352 and 362, sputtered particles are introduced onto the first conductive film 370 by an angle of θ, so that the forefronts of the second electrode films 352 and 362 are risen at the inner angle θ2. In the case of fabricating the thin film magnetic head as shown in FIG. 4, it is required that the hard films are formed before and after the first electrode films are formed. In this case, therefore, the film-forming processes for the hard films such as sputtering are also required.

Figure 8:
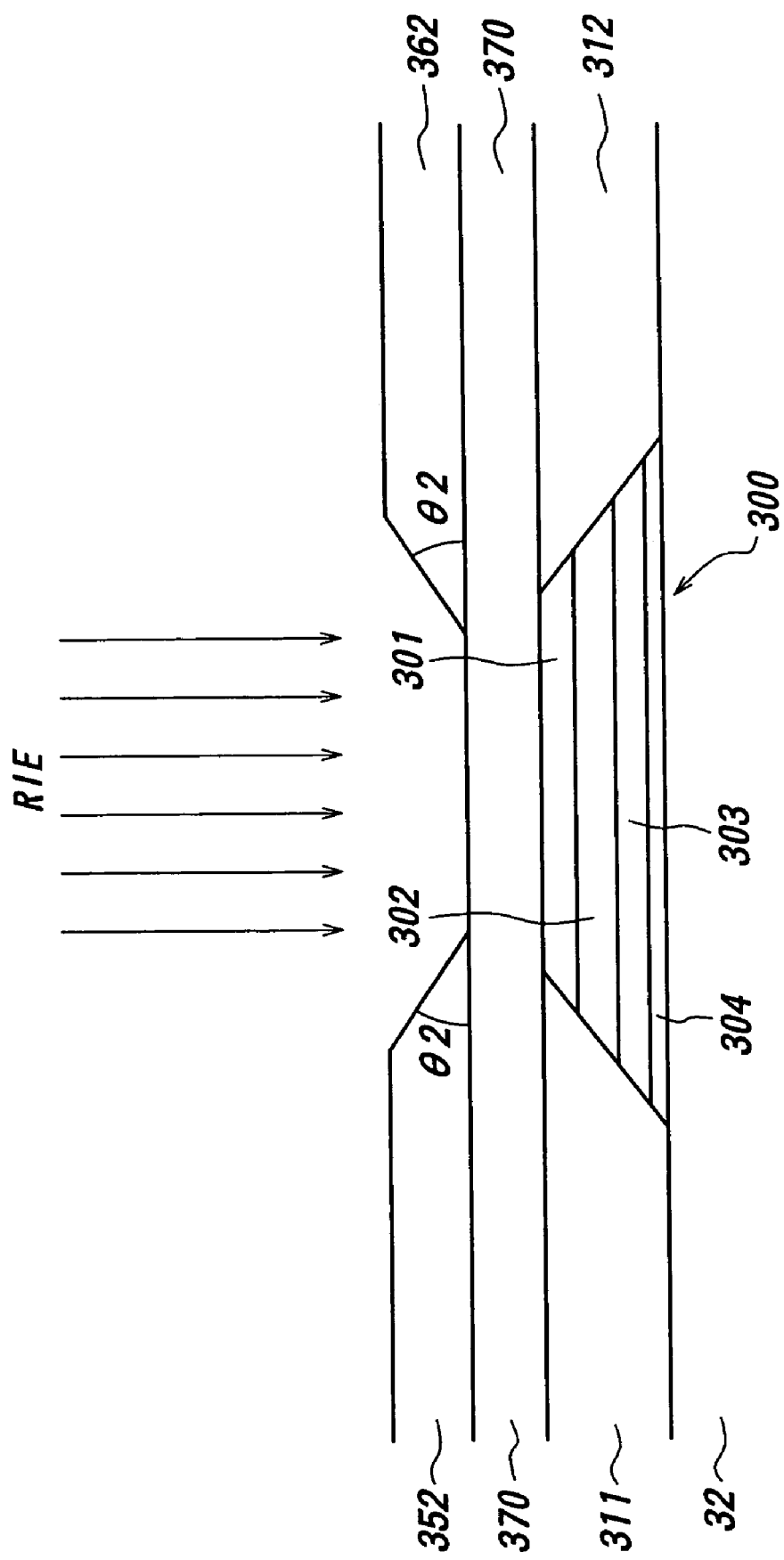
FIG. 8 is an explanatory view showing the next step after the step shown in FIG. 7.
Figure 9:
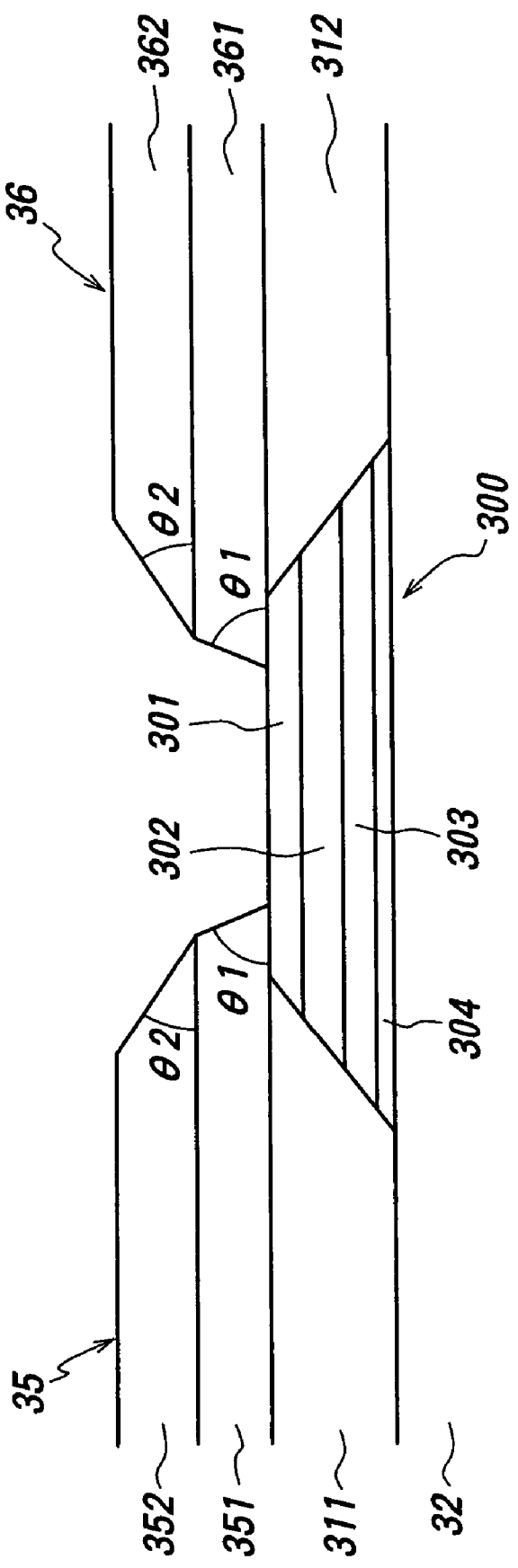
FIG. 9 is an explanatory view showing the next step after the step shown in FIG. 8.

Then, the resist mask is removed, and thereafter, as shown in FIG. 8, the first electrode film 370 is etched and patterned by means of RIE using the second electrode films 352 and 362 as a mask, to form the first electrode films 351 and 361 (see, FIGS. 3 and 4). The RIE process is carried out as plasma etching using Ar/O$_2$ gas mixture.

As a result, the overlaying degree of the first electrode films 351 and 361 on the free layer 301 of the magnetoresistive effective film 300 is set to ΔL, and the rising angle of the first electrode films 351 and 361 is set to the inner angle θ1.

Since the first electrode films 351 and 361 are patterned by using the second electrode films 352 and 362 as a mask, the inner angle θ1 is set larger than the inner angle θ2.

Then, requisite fabricating processes are performed to form a writing element 2 and thus, complete a thin film magnetic film. Although in this embodiment, attention is paid to one thin film magnetic head to be fabricated, in real fabricating process, the above-mentioned fabricating process is carried out on one wafer to fabricate plural thin film magnetic heads simultaneously.

Figure 10:
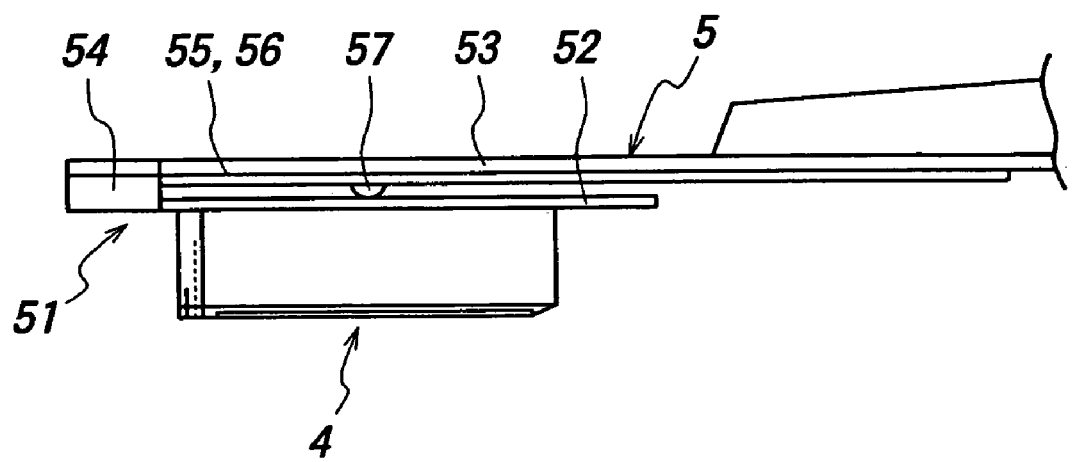
FIG. 10 is an elevational view showing a portion of a magnetic head device according to the present invention.
Figure 11:
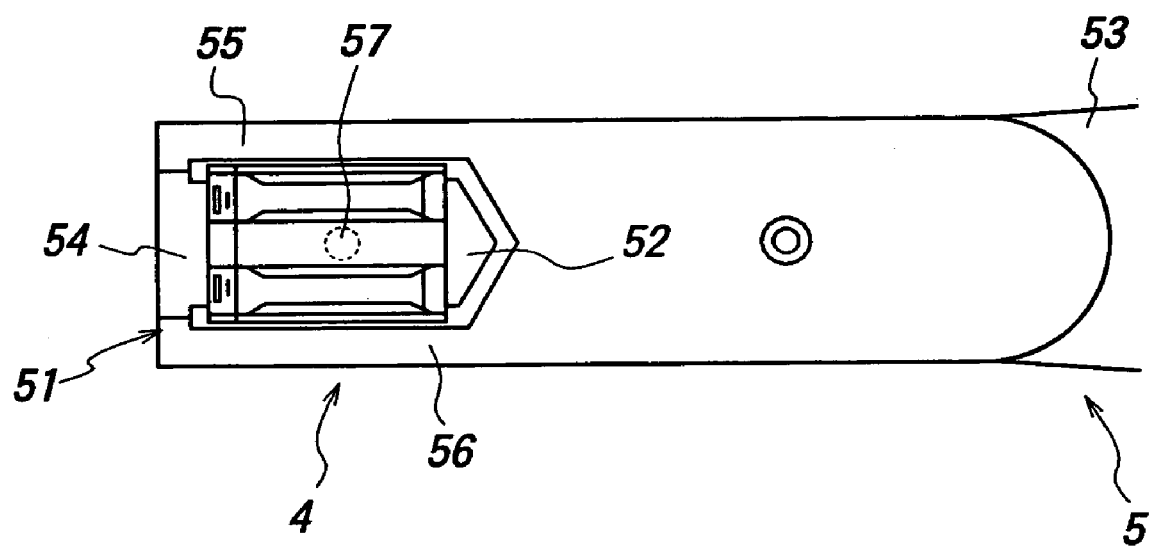
FIG. 11 is a bottom view showing the magnetic head device illustrated in FIG. 10.

FIG. 10 is an elevational view showing a portion of a magnetic head device according to the present invention, and FIG. 11 is a bottom view showing the magnetic head device illustrated in FIG. 10. The illustrated magnetic head device includes a thin film magnetic head 4 as shown in FIGS. 1-4 according to the present invention and a head supporting device 5.

The head supporting device 5 supports the thin film magnetic head 4 at the under surface of a flexible member 51 made of a metallic plate which is attached on the free edge thereof in the long direction of a supporting member 53 made of a metallic plate.

The flexible member 51 has two outer frames 55 and 56 extending along the long direction of the supporting member 53, a side frame 54 to join the outer frames 55 and 56 at the edge thereof, and a tongue-shaped member 52, of which one end is a free edge, extending along the outer frames 55 and 56 from the center of the side frame.

On the center of the tongue-shaped member 52 is positioned a hemispherical loading protrusion 57, bulging on the supporting member 53, to apply load to the tongue-shaped member 52.

The thin film magnetic head 4 is attached on the under surface of the tongue-shaped member 52 so that it can have its air outflow edge along the side frame 54. In the present invention, the head supporting device 5 is not limited to the above embodiment.

Figure 12:
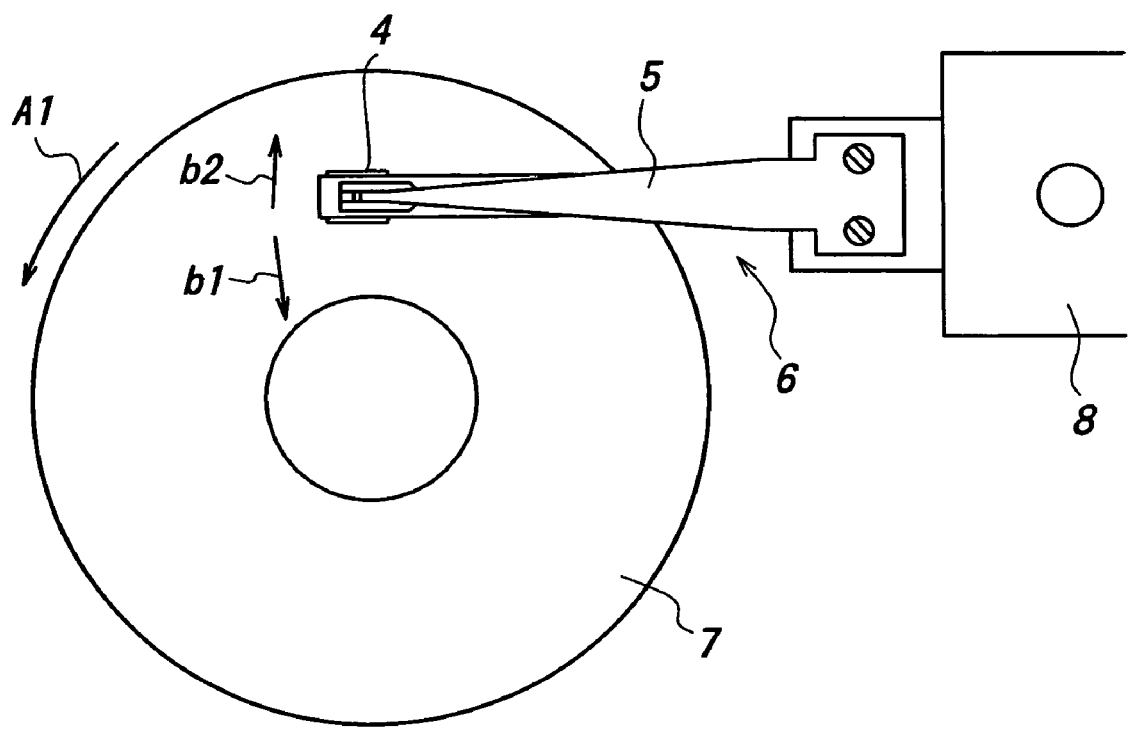
FIG. 12 is a plan view showing a magnetic recording/reproducing drive device according to the present invention.

FIG. 12 is a plan view showing a magnetic recording/reproducing drive device according to the present invention. A magnetic recording/reproducing drive device depicted in FIG. 12 includes a magnetic head device 6 as shown in FIGS. 10 and 11 and a magnetic disk 7. The magnetic head device 6 is driven by a position determining device 8 which supports one end of the device 5. The thin film magnetic head 4 of the magnetic head device 5 is supported by the head supporting device 5 so that it can face the magnetic recording surface of the magnetic disk 7.

When the magnetic disk 7 is rotated in the A1 direction by a driving device (not shown), the thin film magnetic head 4 is floated from on the magnetic disk 7 by a minute distance. In this case, rotary-actuator driving system is normally employed as a driving mechanism, but linear-actuator driving system may be employed. In this embodiment, the rotary-actuator driving system is employed, and then, the thin film magnetic head 4 attached to the free edge of the head supporting device 5 is driven in the radial direction b1 or b2 of the magnetic disk 7 and positioned on a given track by the position determining device 8.

Although the present invention was described in detail with reference to the above examples, this invention is not limited to the above disclosure and every kind of variation and modification may be made without departing from the scope of the present invention.

As mentioned above, according to the present invention,
(a) a thin film magnetic head, a magnetic head device, a magnetic recording/reproducing drive device where the reliability in electric insulation between the top shielding film and the electrode film, and a method for fabricating the thin film magnetic head can be provided, and
(b) a thin film magnetic head, a magnetic head device and a magnetic recording/reproducing drive device where electro-migration due to large current density can be prevented, and a method for fabricating the thin film magnetic head can be provided.

What is claimed is:

1. A thin film magnetic head comprising a reading element including a magnetoresistive effective film to respond commensurate with an external magnetic field, a pair of magnetic domain-controlling films arranged at both edge sides of said magnetoresistive effective film to apply a perpendicular biasing magnetic field to said magnetoresistive effective film and a pair of electrode films, each composed of a first electrode film and a second electrode film, a forefront of said first electrode film being overlaid on said magnetoresistive effective film,
a forefront surface of said first electrode film being risen at an inner angle of θ1,
said first electrode film being formed on both said magnetoresistive effective film and said magnetic domain-controlling film,
said second electrode film being formed on said first electrode film,
a forefront surface of said second electrode film extending in a kinked line shape from an end position of said forefront surface of said first electrode film and being risen at an inner angle θ2 smaller than said inner angle θ1, wherein said reading element further includes a conductive hard film, which is made of at least one selected from the group consisting of Ti, Zr, Hf, V, Nb, Ta, Cr, Mo, W, Ru, Rh, Ir. Pd, Cu, Si, and Al and extends from only said forefront of said second electrode film without extending from said forefront of said first electrode film so as to cover an entire surface of said second electrode film.

2. The thin film magnetic head according to claim 1, wherein the thickness of said hard film is set within 1-50 nm.

3. The thin film magnetic head according to claim 1, wherein said reading element further includes an oxide film formed on said hard film.

4. The thin film magnetic head according to claim 3, wherein said oxide film is made of at least one selected from the group consisting of Ti, Zr, Hf, V, Nb, Ta, Cr, Mo, W, Ru, Rh, Ir, Pd, Cu, Si and Al.

5. The thin film magnetic head according to claim 3, wherein the thickness of the oxide film is set within 1-10 nm.

* * * * *